United States Patent [19]
Tunehiro et al.

[11] Patent Number: 5,119,007
[45] Date of Patent: Jun. 2, 1992

[54] INVERTER CONTROL APPARATUS

[75] Inventors: Yuzuru Tunehiro, 8-12-2, Fujiyamadai, Kasugai City, Aichi Prefecture; Masahiko Iwasaki; Masakatu Daijo, both of Nagoya, all of Japan

[73] Assignees: Yuzuku Tunehiro; Mitsubishi Denki Kabushiki Kaisha, both of Tokyo, Japan

[21] Appl. No.: 589,756

[22] Filed: Sep. 28, 1990

[30] Foreign Application Priority Data

Sep. 29, 1989 [JP] Japan .................. 1-254774
Mar. 22, 1990 [JP] Japan .................. 2-73114

[51] Int. Cl.⁵ ............................................. H02P 5/40
[52] U.S. Cl. .............................. 318/801; 318/807; 318/811
[58] Field of Search .............. 318/798, 800, 803, 805, 318/807, 811, 806, 801, 71, 78

[56] References Cited

U.S. PATENT DOCUMENTS

| | | | |
|---|---|---|---|
| 4,503,375 | 3/1985 | Okuyama | 318/805 |
| 4,575,667 | 3/1986 | Kurakake | 318/803 |
| 4,724,373 | 2/1988 | Lipo | 318/805 |
| 4,800,327 | 1/1989 | Fujioka et al. | 318/811 |
| 4,808,903 | 2/1989 | Matsui et al. | 318/800 |
| 4,825,131 | 4/1989 | Nozaki et al. | 318/71 |
| 4,885,518 | 12/1989 | Schauder | 318/798 |
| 4,967,135 | 10/1990 | Ashikaga et al. | 318/805 |

FOREIGN PATENT DOCUMENTS

| | | |
|---|---|---|
| 3221906 | 12/1983 | Fed. Rep. of Germany . |
| 60-113684 | 6/1985 | Japan . |
| 63-277489 | 1/1988 | Japan . |
| 2190805 | 11/1987 | United Kingdom . |

Primary Examiner—William M. Shoop, Jr.
Assistant Examiner—John W. Cabeca
Attorney, Agent, or Firm—Rothwell, Figg, Ernst & Kurz

[57] ABSTRACT

An inverter control apparatus includes a current detector for detecting currents of two phases from among output currents of an inverter that drives an induction motor, a current coordinate converter for converting currents detected by the current detector to a torque current component and an exciting current component, a computing device for computing the output frequency of the inverter corrected on the basis of a discrepancy proportional to the difference between an exciting current set value and an exciting current by using the torque current component and the exciting current component obtained by the current coordinate converter and for computing a torque voltage component and an exciting voltage component of the output voltage in synchronization with this output frequency, a voltage coordinate converter for converting the torque voltage component and the exciting voltage component computed by the computing device to a three-phase AC voltage of the output frequency of the inverter, and a PWM controller for generating switching control signals of the inverter on the basis of the three-phase AC voltage obtained by the voltage coordinate converter.

3 Claims, 8 Drawing Sheets

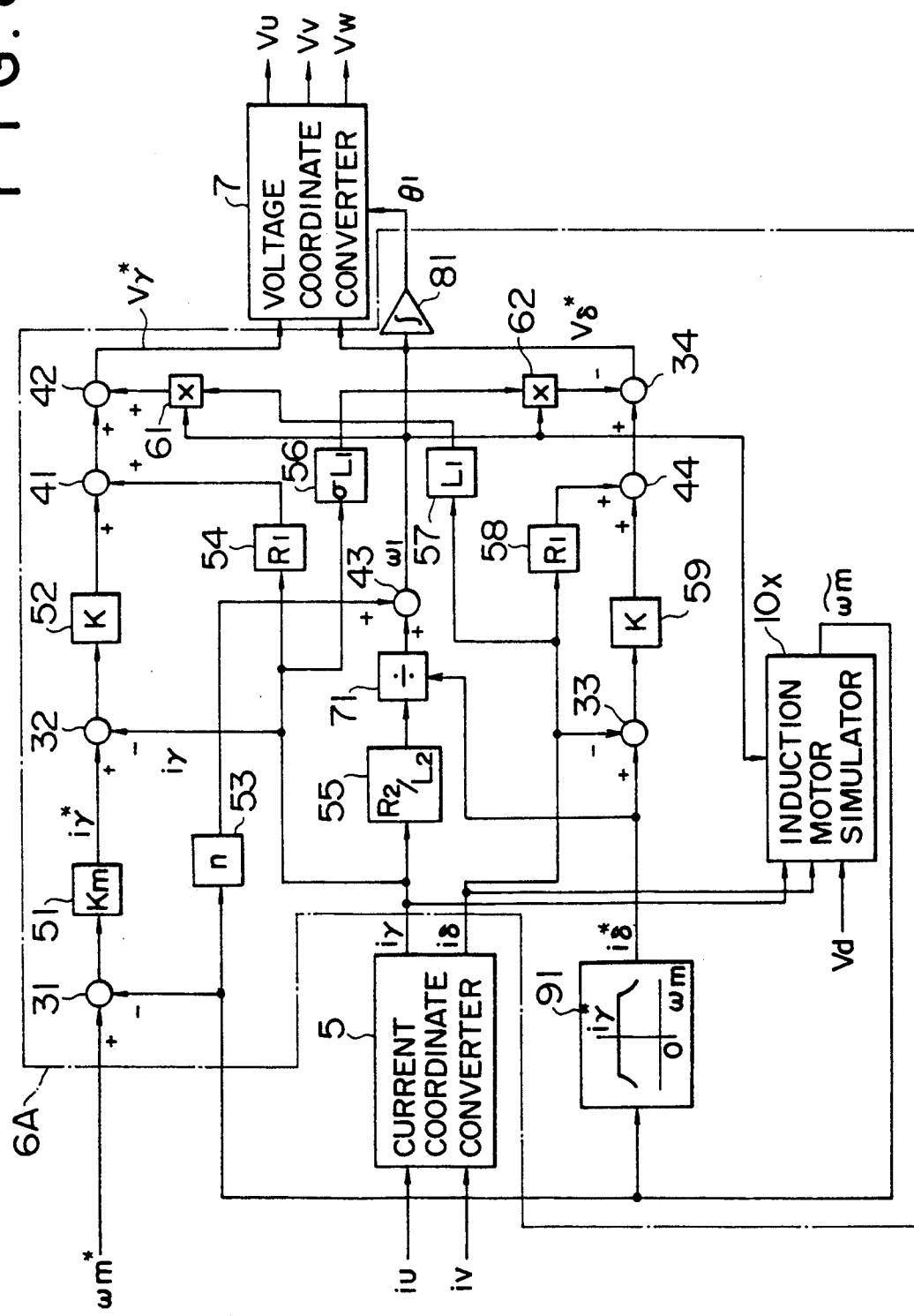

INVERTER CONTROL APPARATUS

BACKGROUND OF THE INVENTION

1. Field of the Invention

The present invention relates to a control apparatus that performs vector control an inverter for driving an induction motor and, in particular, to improvements in the precision and response of the speed control thereof.

2. Description of the Related Art

FIG. 5 is a block diagram illustrating a conventional control apparatus for an inverter which drives an induction motor by converting a DC power to an AC power of an arbitrary frequency and voltage. In FIG. 5, numeral 1 denotes an inverter, 2 denotes a motor driven by the inverter 1, 3 denotes a speed detector for detecting the rotational speed of the motor 2, 4 denotes a current detector for detecting two phases of the output current of the inverter 1, e.g., a U-phase current $i_U$ and a V-phase current $i_V$.

Numeral 5 denotes a current coordinate converter which converts currents $i_U$ and $i_V$ detected by the current detector 4 to a torque current $i_\gamma$ and an exciting current $i_\delta$ in current coordinates. Numeral 6 denotes a computing unit which computes the output frequency $\omega_1$ of the inverter 1 on the basis of a speed set value $\omega_m^*$ of the motor 2, a torque current $i_\gamma$ and an exciting current $i_\delta$ sent from the current coordinate converter 5, and a speed detection value $\omega_m$ detected by the speed detector 3, and computes and outputs a torque voltage $v_\gamma^*$, an exciting voltage $v_\delta^*$, and a phase $\theta_1$ of the output voltage.

Numeral 7 denotes a voltage coordinate converter which determines three-phase output voltages $v_u$, $v_v$, and $v_w$ on the basis of the torque voltage $v_\gamma^*$, exciting voltage $v_\delta^*$ and phase $\theta_1$ sent from the computing unit 6. Numeral 8 denotes a PWM controller which produces switching signals for turning the switching elements of the inverter 1 on or off by multiplying a DC bus line voltage Vd by the output voltages $v_u$, $v_v$, and $v_w$ sent from the voltage coordinate converter 7.

The basic rules of vector control in the computing unit 6 of the control apparatus configured as described above conform to the following four equations:

$$v_\gamma^* = K(i_\gamma^* - i_\gamma) + R_1 i_\gamma + L_1 \omega_1 i_\gamma \quad (1)$$

$$V_\delta^* = K(i_\delta^* - i_\delta) + R_1 i_\delta - \sigma L_1 \omega_1 i_\gamma \quad (2)$$

$$i_\gamma^* = K_m(\omega_m^* - \omega_m) \quad (3)$$

$$\omega_1 = n\omega_m + R_2 i_\gamma / L_2 i_\delta^* \quad (4)$$

where K is an amplification gain of the difference between the torque current set value $i_\gamma^*$ and the torque current $i_\gamma$ and of the difference between the exciting current set value $i_\delta^*$ and the exciting current $i_\delta$, $K_m$ is an amplification gain of the difference between the speed set value $\omega_m^*$ and the speed detection value $\omega_m$, $R_1$ is a primary resistance value of the motor 2 which is a load, $R_2$ is a secondary resistance value of the motor 2, $L_1$ is a primary reactance of the motor 2, $\sigma$ is a current leakage coefficient ($\sigma = 1 - M^2/L_1 L_2$), and n is the number of pole pairs of the motor 2.

FIG. 6 is a block diagram illustrating the computing unit 6 configured according to the above-mentioned basic rules. In FIG. 6, numerals 31 to 34 denote subtracters, numerals 41 to 44 denote adders, 51 to 59 denote amplifiers, 61 and 62 denote multipliers, 71 denotes a divider, 81 denotes an integrator, and 91 denotes an exciting current setter.

The operation of the inverter control apparatus configured as described above will be explained below.

When currents $i_u$, $i_v$ detected by the current detector 4 are sent to the current coordinate converter 5, the current coordinate converter 5 performs a calculation shown below to compute the torque current $i_\gamma$ and exciting current $i_\delta$ and sends these to the computing unit 6.

$$\begin{pmatrix} i_\gamma \\ i_\delta \end{pmatrix} = \sqrt{2} \begin{pmatrix} \sin(\theta_1 + \pi/3), & \sin\theta_1 \\ -\cos(\theta_1 + \pi/3), & -\cos\theta_1 \end{pmatrix} \begin{pmatrix} i_u \\ i_v \end{pmatrix} \quad (5)$$

where $\theta_1 = \omega_1 t$.

In FIG. 6, the computing unit 6 computes, using the subtracter 31, the difference between the speed set value $\omega_m^*$ and the speed detection value $\omega_m$ of the motor 2 which is detected by the speed detector 3, and then computes the torque current set value $i_\gamma^*$ shown in equation (3) by multiplying the computed difference $(\omega_m^* - \omega_m)$ by gain $K_m$.

The exciting current computed value $i_\delta^*$ is set in correspondence to the speed of the motor 2. That is, the speed detection value $\omega_m$ is sent to the exciting current setter 91 by means of which the exciting current set value $i_\delta^*$ is calculated.

The output frequency $\omega_1$ of the inverter 1 shown in equation (4) is computed as follows: First, the speed detection value $\omega_m$ is multiplied by n by means of the amplifier 53 to compute $n\omega_m$ shown in term 1 of equation (4). Next, the torque current $i_\gamma$ sent from the current coordinate converter 5 is multiplied by gain $R_2/L_2$ by means of the amplifier 55 and is sent to the divider 71. The divider 71 computes the secondary frequency $R_2 i_\gamma / L_2 i_\delta^*$ shown in term 2 of equation (4) on the basis of the $R_2 i_\gamma / L_2$ sent and the exciting current set value $i_\delta^*$ from circuit 92. This secondary frequency $R_2 i_\gamma / L_2 i_\delta^*$ is added to $n\omega_m$ by the adder 43 to compute the output frequency $\omega_1$ of the inverter 1.

The difference $(i_\gamma^* - i_\gamma)$ between the torque current set value $i_\gamma^*$ and the torque current $i_\gamma$ is computed by means of the subtracter 32. This difference $(i_\gamma^* - i_\gamma)$ is multiplied by gain K by means of the amplifier 52 to compute the voltage component K $(i_\gamma^* - i_\gamma)$ shown in term 1 of equation (1). At the same time, the torque current $i_\gamma$ is multiplied by gain $R_1$ by means of the amplifier 54 to compute the voltage component $R_1 i_\gamma$ shown in term 2 of equation (1). Meanwhile, the exciting current $i_\delta$ sent from the current coordinate converter 5 is multiplied by gain $L_1$ by means of the amplifier 57, and this $L_1 i_\delta$ is multiplied by the output frequency $\omega_1$ by means of the multiplier 61, with the result that $L_1 \omega_1 i_\delta$ shown in term 3 of equation (1) is computed. The torque voltage $v_\gamma^*$ shown in equation (1) is determined by adding these voltage components by means of adders 41 and 42.

Meanwhile, in the same manner as for the torque voltage $v_\gamma^*$, the voltage component of each term of equation (2) is computed using the exciting current set value $i_\delta^*$, the exciting current $i_\delta$, the torque current $i_\gamma$, and the output frequency $\omega_1$ by means of the subtracter 33, the amplifiers 59, 58 and 56, and the multiplier 62, and is added or subtracted by means of the adder 44 or the subtracter 34 to determine the exciting voltage $v_\delta^*$ shown in equation (2).

The output frequency $\omega_1$ is sent to the integrator 81 where it is integrated with respect to time, and the voltage phase $\theta_1$ represented by $\theta_1 = \int \omega_1 dt$ is determined.

The torque voltage $v_\gamma^*$, the exciting voltage $v_\delta^*$ and the voltage phase $\theta_1$ determined by means of the computing unit 6 are sent to the voltage coordinate converter 7 where the following equation is performed to compute three-phase output voltages $v_u$, $v_v$, and $v_w$.

$$\begin{pmatrix} v_u \\ v_v \\ v_w \end{pmatrix} = \begin{pmatrix} \cos\theta_1, & \sin\theta_1 \\ \cos(\theta_1 - 2\pi/3), & \sin(\theta_1 - 2\pi/3) \\ \cos(\theta_1 + 2\pi/3), & \sin(\theta_1 + 2\pi/3) \end{pmatrix} \begin{pmatrix} v_\gamma^* \\ v_\delta^* \end{pmatrix} \quad (6)$$

These output voltages $v_u$, $v_v$, and $v_w$ are sent to the PWM controller 8 shown in FIG. 3, in which an on/off signal for each switching element of the inverter 1 is produced.

By performing vector control for the inverter 1 as described above, the $\gamma$-axis (torque axis) component $\lambda_\gamma$ of the secondary interlinkage magnetic flux of the motor 2 becomes zero, and the $\delta$-axis (exciting axis) component $\lambda_\delta$ becomes constant. As a result, the output torque $\tau$ of the motor 2 can be rendered proportional to the product of the exciting current set value $i_\delta^*$ and the torque current $i_\gamma$ and thus excellent control performance can be obtained.

FIG. 7 is a block diagram illustrating a conventional inverter control apparatus of a type in which no speed detector is used. FIG. 8 is a block diagram illustrating a computing unit used in the control apparatus in FIG. 7. Elements in FIGS. 7 and 8 which correspond to essentially the same elements in FIGS. 5 and 6 are identified by the same reference designations, and an explanation of the construction thereof is omitted to avoid duplication of the same. A point of difference between FIG. 7 and the example of the prior art shown in FIG. 5 is that the speed detector 3 for detecting the rotational speed of the motor 2 is not disposed in the motor 2. A point of difference between the computing unit 6A and the computing unit 6 shown in FIG. 6 is that an induction motor simulator 10x is disposed. This induction motor simulator 10x estimates the speed $\tilde{\omega}_m$ of the motor 2 on the basis of the torque current $i_\gamma$ and the exciting current $i_\delta$, on which coordinate conversion has been performed by the current coordinate converter 5, and the DC bus line voltage Vd. An example of the estimating method is presented in "Speed sensorless vector control of induction motor in which model range adaptation system is applied" presented in Part D, Electrical Society thesis (issued Mar. 1988).

In this example of the prior art, regarding the torque current set value $i_\gamma^*$, the difference between the speed set value $\omega_m^*$ and the speed estimation value $\tilde{\omega}_m$ is computed by means of the subtracter 31. The computed difference $(\omega_m^* - \tilde{\omega}_m)$ is multiplied by gain $K_m$ by means of the multiplier 51 to compute the torque current set value $i_\gamma^*$. Of the above-mentioned four equations showing the basic rules of vector control, equations (3) and (4) are expressed in the following manner:

$$i_\gamma^* = K_m(\omega_m^* - \tilde{\omega}_m) \quad (7)$$

$$\omega_1 = n\tilde{\omega}_m + R_2 i_\gamma / L_2 i_\gamma 1 \quad (8)$$

The exciting current set value $i_\delta^*$ is set by means of the exciting current setter 91 on the basis of the speed estimation value $\tilde{\omega}_m$ of the motor 2.

In addition, regarding the output frequency $\omega_1$ of the inverter 1, the speed estimation value $\tilde{\omega}_m$ of the motor 2 is multiplied by n by means of the amplifier 53 to compute the $n\tilde{\omega}_m$ shown in term 1 of equation (8).

As described above, in this example of the prior art, the speed estimation value $\tilde{\omega}_m$ of the induction motor simulator 10x is used in place of the speed detection value $\omega_m$ by means of the speed detector 3 of the prior art shown in FIGS. 5 and 6. The subsequent operations are essentially the same as the operations of the example of the prior art shown in FIGS. 5 and 6.

However, when the motor 2 driven by an inverter is controlled by vector control with high precision as mentioned above, the constants of the motor 2, for example, a primary resistance $R_1$ and a secondary resistance $R_2$ used in the above calculations, must be in agreement with the actual resistance values of the motor 2. In particular, when the secondary resistance $R_2$ varies due to a rise in temperature or the like of the motor 2, the output frequency $\omega_1$, the torque voltage $v_\gamma^*$, and the exciting voltage $v_\delta^*$ cannot follow the variation, thus causing the performance of accurate vector control to be impossible. For this reason, in spite of the fact that the exciting current set value $i_\delta^*$ is constant, the $\delta$-axis component $\lambda_\delta$ of the secondary interlinkage magnetic flux will not be constant, and the $\gamma$-axis component $\lambda_\gamma$ will thus not be zero. Therefore, the output torque $\tau$ of the motor, which is one target of the vector control, can not be rendered proportional to the product of the exciting current set value $i_\delta^*$ and the torque current $i_\gamma$. This causes a drawback in that control performance is degraded.

In the case of vector control under which no speed detector is used, since the action of the motor 2 is simulated on the basis of the constant itself of the motor 2 by using the induction motor simulator 10x, the speed estimation on value $\tilde{\omega}_m$ deviates in the same manner as above in the case where the actual constant value of the motor 2 is not in agreement with that of the simulator. Thus, a disadvantage exists in that the entire system will not be stable and the system will be operated at a greatly deviated speed.

SUMMARY OF THE INVENTION

The present invention has been devised to eliminate the above-mentioned drawbacks. An object of the present invention is to provide an inverter control apparatus which is capable of performing accurate vector control even if the values of a primary and a secondary resistance used in the control differ from the actual resistance values of the motor.

Another object of the present invention is to provide an inverter control apparatus which is capable of substantially estimating the speed of a motor and performing accurate vector control without using a simulator for an induction motor under a method wherein when a discrepancy occurs between the constant of a motor and the value used in the control, it is corrected.

An inverter control apparatus of the present invention comprises a current detector for detecting currents of two phases from among output currents of an inverter that drives an induction motor; a current coordinate converter for converting currents detected by the current detector to a torque current component and an exciting current component; a computing device for computing the output frequency of the inverter corrected on the basis of a discrepancy proportional to the difference between an exciting current set value and an exciting current by using the torque current component and the exciting current component obtained by the current coordinate converter and for computing a torque voltage component and an exciting voltage component of the output voltage in synchronization with this output frequency; a voltage coordinate converter for converting the torque voltage component and the exciting voltage component computed by the computing device to a three-phase AC voltage of the output frequency of the inverter; and a PWM controller for generating switching control signals of the inverter on the basis of the three-phase AC voltage obtained by the voltage coordinate converter.

These and other objects, features and advantages of the present invention will become clear when reference is made to the following description of the preferred embodiments of the present invention, together with reference to the accompanying drawings.

DESCRIPTION OF THE PREFERRED EMBODIMENTS

The embodiments of the present invention will be explained hereinunder with reference to the accompanying drawings.

Figure 1:
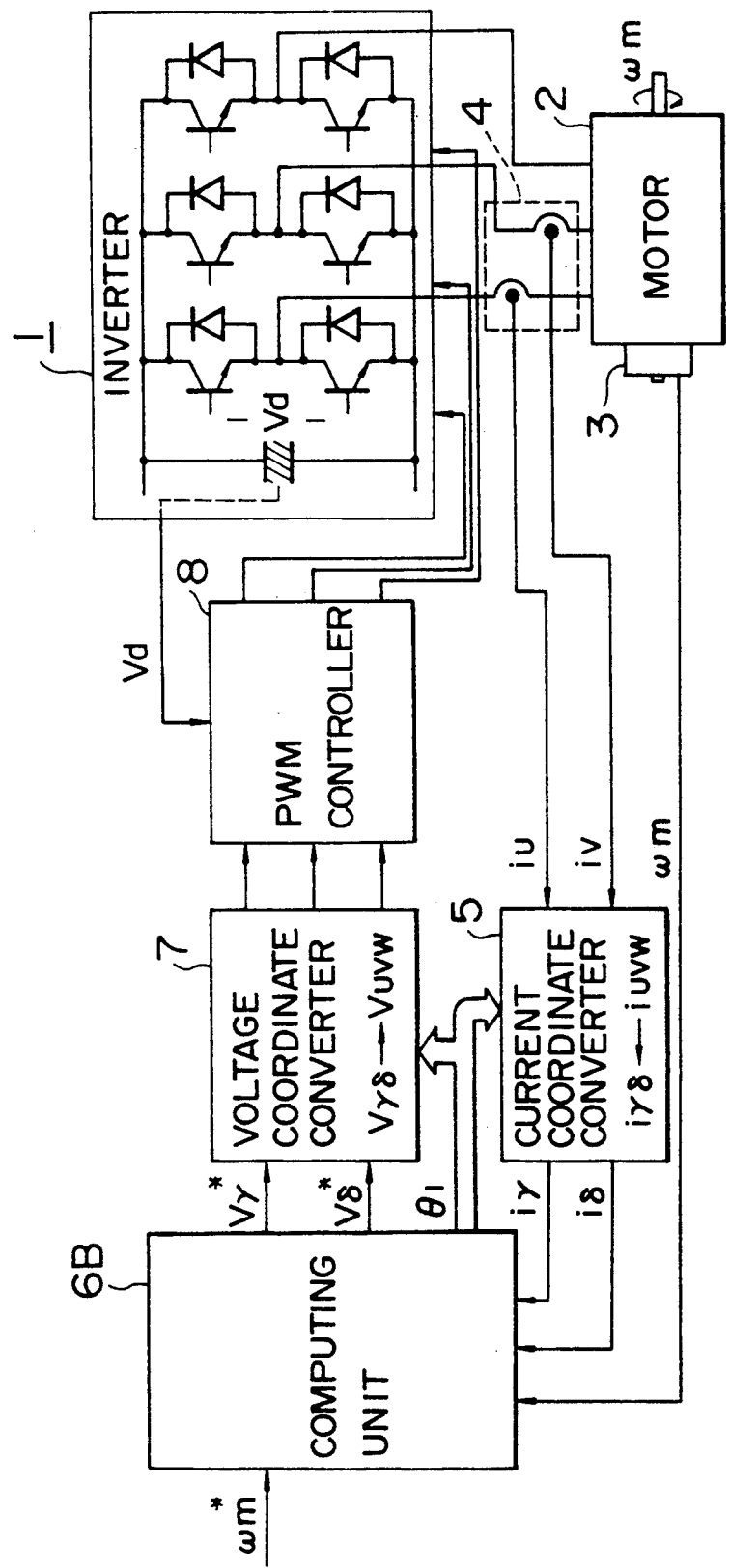
FIG. 1 is a block diagram illustrating an inverter control apparatus in a first embodiment of the present invention.

In FIG. 1, the inverter control apparatus in the first embodiment of the present invention comprises a speed detector 3 for detecting the rotational speed of the induction motor 2 which is driven by the inverter 1, a current detector 4 for detecting two phases from among the output currents of the inverter 1, e.g., a U-phase current $i_U$ and a V-phase current $i_v$, a current coordinate converter 5 connected to the current detector 4, and a computing unit 6B connected to the speed detector 3 and to the current coordinate converter 5. A voltage coordinate converter 7 is connected to the computing unit 6B. In addition, a PWM controller 8 which generates an on/off signal for each switching element of the inverter 1 is connected to the voltage coordinate converter 7.

The current coordinate converter 5 converts currents $i_U$ and $i_V$ detected by the current detector 4 to a torque current component $i_\gamma$ and an exciting current component $i_\delta$. The computing unit 6B computes an output frequency $\omega_1$ of the inverter 1, a torque voltage component $v_\gamma$, an exciting voltage component $v_\delta$, and a phase $\theta_1$ of the output voltage in synchronization with the output frequency $\omega_1$. The voltage coordinate converter 7 computes three-phase AC voltages $v_u$, $v_v$, and $v_w$ on the basis of the torque voltage component $v_\gamma$ and the exciting voltage component $v_\delta$ computed by the computing unit 6B.

Figure 5:
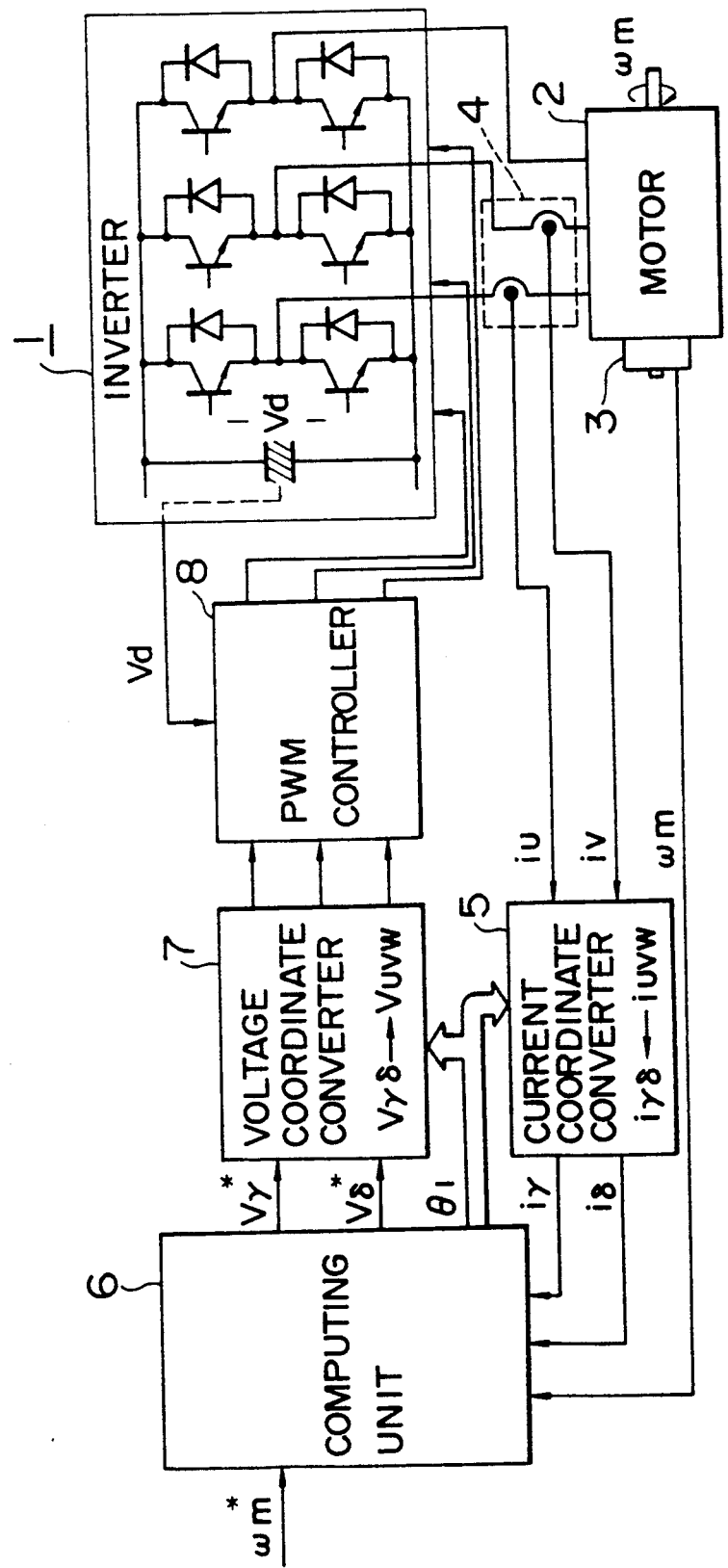
FIG. 5 is a block diagram illustrating an inverter control apparatus of the prior art.

That is, the inverter control apparatus of the first embodiment is an apparatus in which the computing unit 6B is disposed in place of the computing unit 6 in the control apparatus of FIG. 5.

Figure 2:
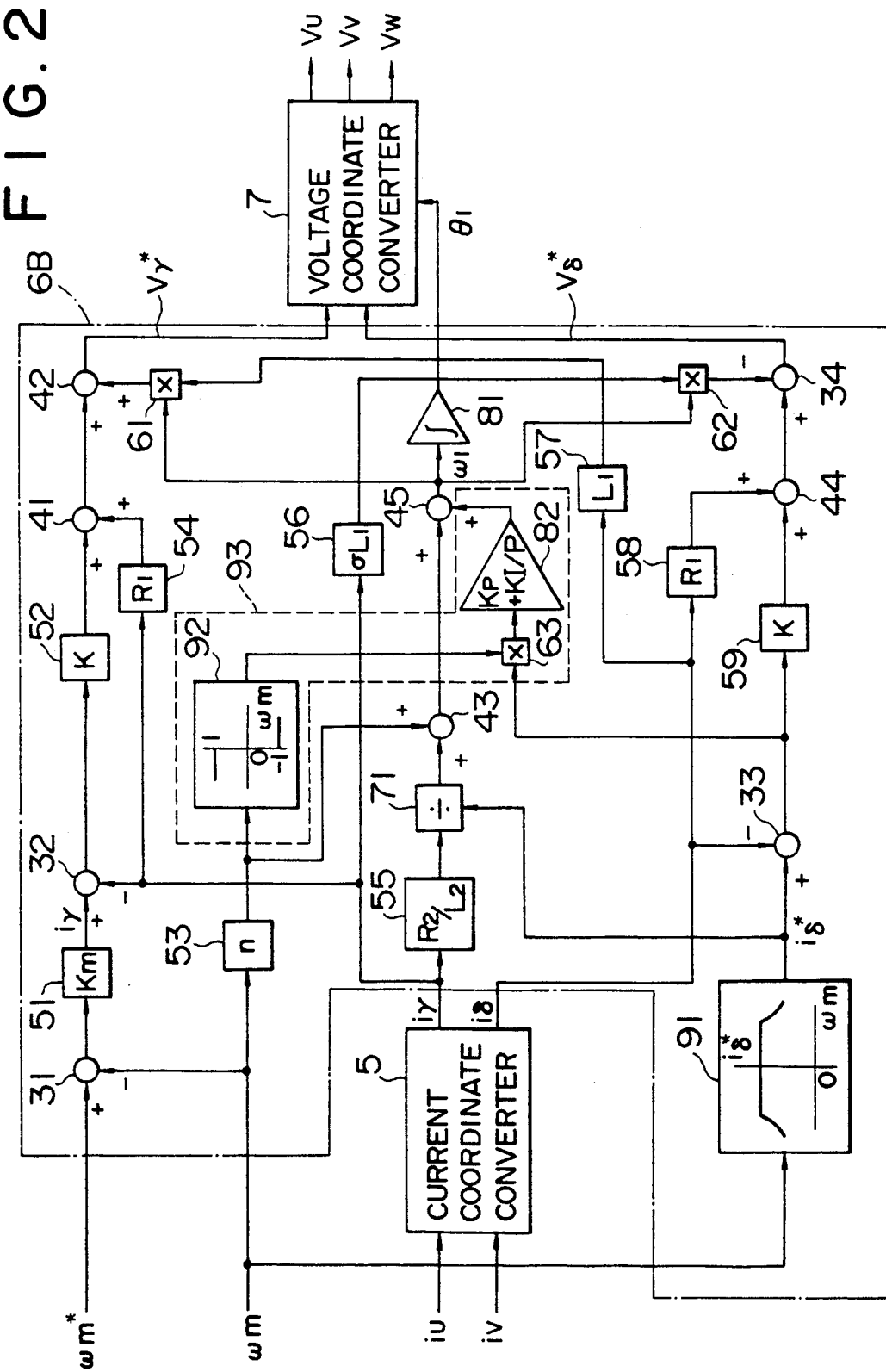
FIG. 2 is a block diagram illustrating a computing unit used in the first embodiment.
Figure 6:
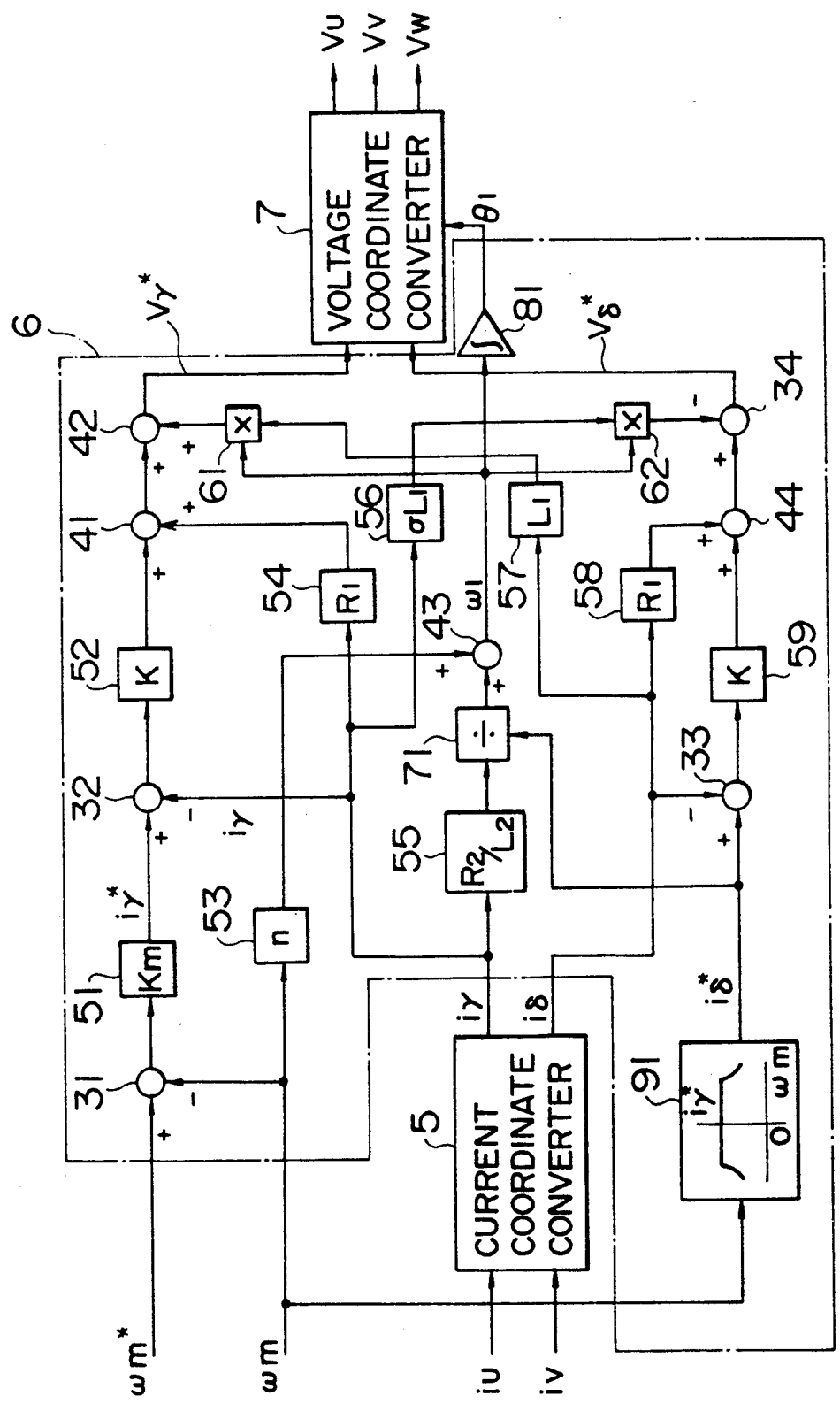
FIG. 6 is a block diagram illustrating a computing unit used in the prior art.
Figure 7:
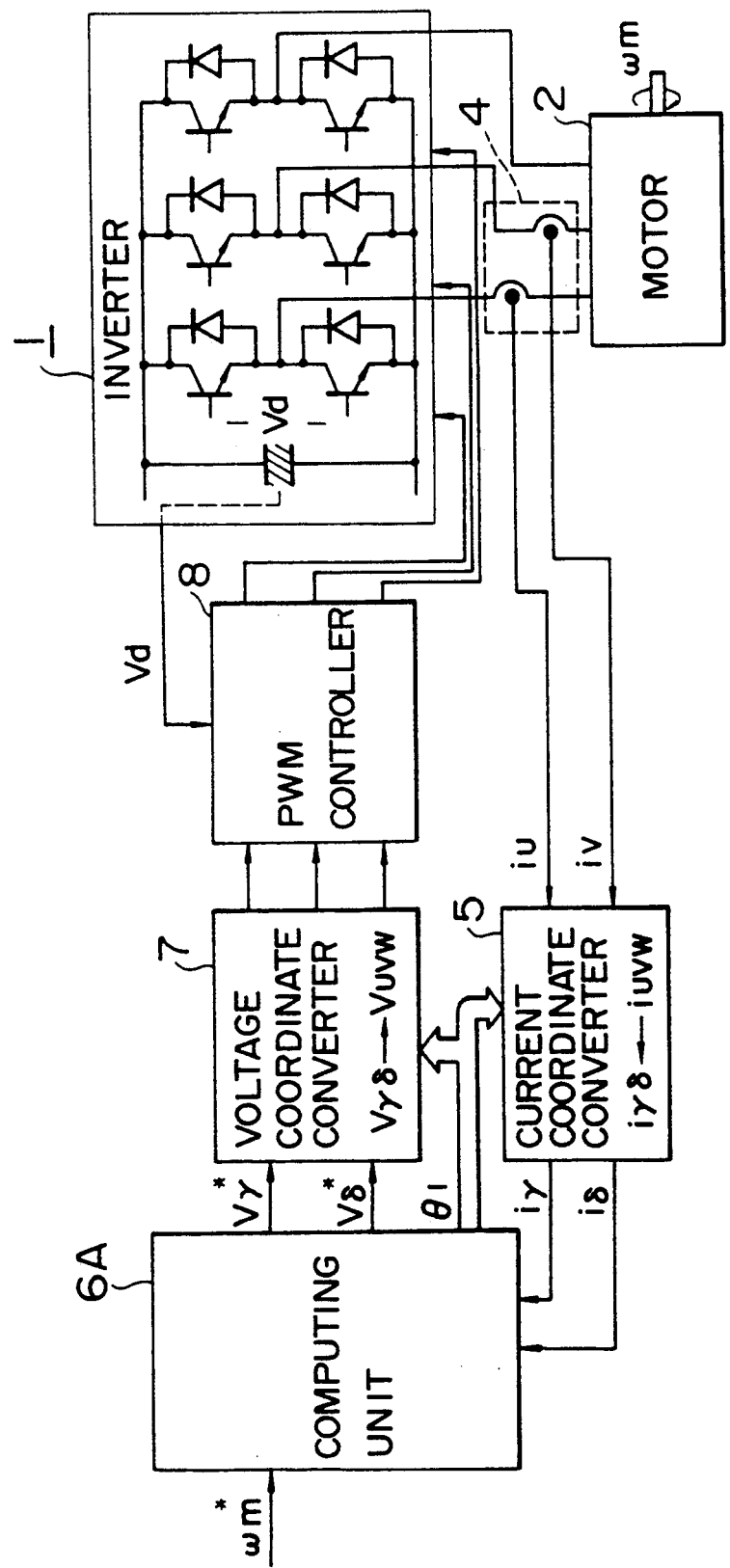
FIG. 7 is a block diagram illustrating an inverter control apparatus of another prior art.
Figure 5:
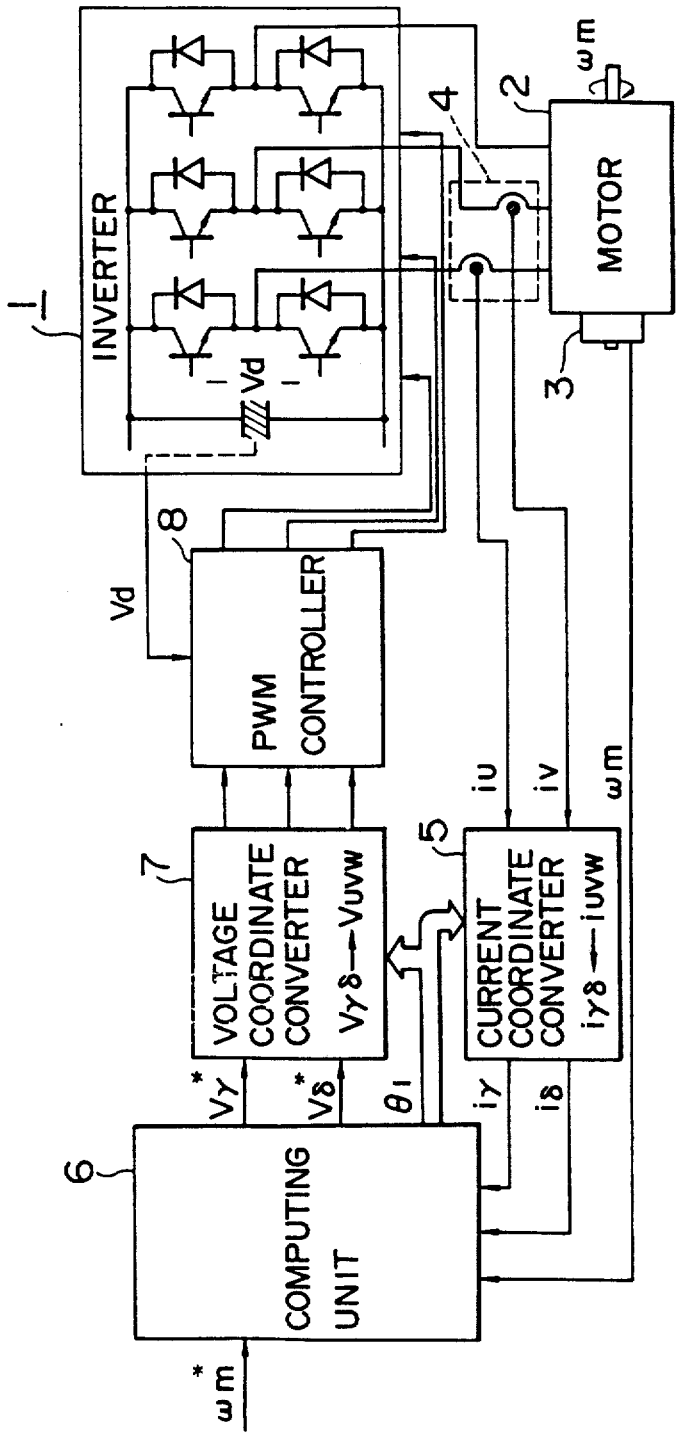
Figure 8:
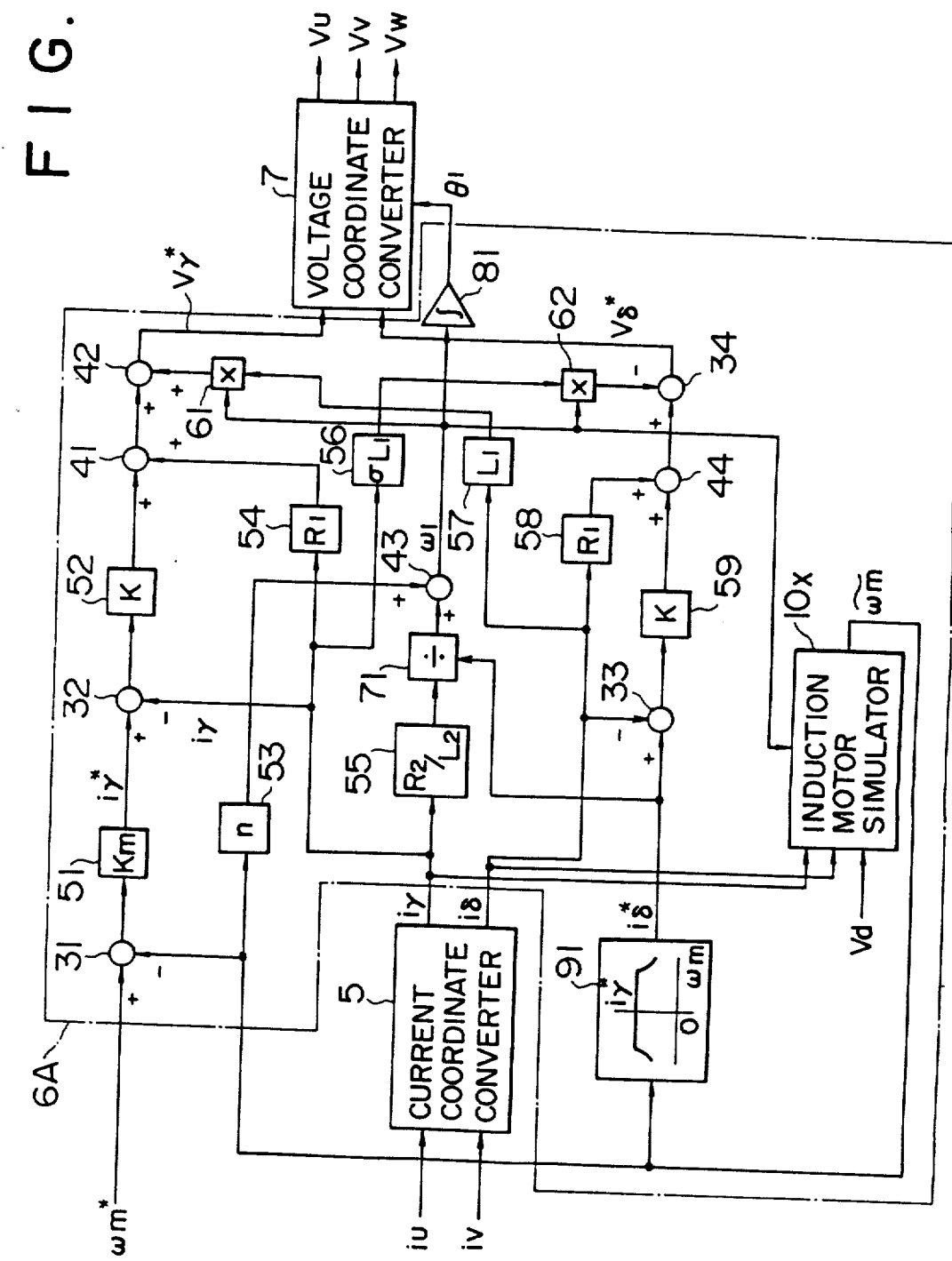
FIG. 8 is a block diagram illustrating a computing unit used in the prior art of FIG. 7.

The internal arrangement of the computing unit 6B is shown in FIG. 2. In FIG. 2, subtracters 31 to 34, adders 41 to 44, amplifiers 51 to 59, multipliers 61 and 62, a divider 71, an integrator 81, and an exciting circuit setter 91 correspond to the circuit elements of the conventional computing unit 6 which are respectively identified by the same numerals in FIG. 6. A rotation direction detector 92 for detecting the rotational direction of the motor 2 is connected to the amplifier 53. A proportional integrator 82 is connected to the rotation direction detector 92 via a multiplier 63. The rotation direction detector 92 outputs a sign function $-\text{sgn}\,\omega_m$ which becomes $-1$ when the motor 2 rotates forwardly, i.e., the detection value $\omega_m$ from the speed detector $3 \leq 0$; $+1$ when the motor 2 rotates backwardly, i.e., the $\omega_m < 0$. The multiplier 63 multiplies the difference ($i_\delta^* - i_\delta$) between the exciting current set value $i_\delta^*$ and the exciting current $i_\delta$ by the polarity of the rotation direction of the motor 2 sent from the rotation direction detector 92. The proportional integrator 82 has a proportional gain $K_P$ and an integration gain $K_I$, and integrates the output from the multiplier 63. The rotation direction detector 92, the multiplier 63, and the proportional integrator 82 constitute a proportional integration means 93 for detecting a discrepancy in the output frequency. Numeral 45 denotes an adder which adds a discrepancy sent from the proportional integrator 82 to the output frequency sent from the adder 43 to correct the output frequency.

The basic rules of the computing unit 6B configured as described above conform to the following four equations:

$$v_\gamma^* = K(i_\gamma^* - i_\gamma) + R_1 i_\gamma + L_1 \omega_1 i_\delta \tag{9}$$

$$v_\delta^* = K(i_\delta^* - i_\delta) + R_1 i_\delta - \sigma L_1 \omega_1 i_\gamma \tag{10}$$

$$i_\gamma^* = K_m(\omega_m^* - \omega_m) \tag{11}$$

$$\omega_1 = n\omega_m + R_2 i_\gamma / L_2 i_\delta^* + (K_P + K_I/P)(i_\delta - i_\delta^*)\text{sgn}\,\omega_m \tag{12}$$

In the above equation, $P(=d/dt)$ is used as a differential operator, and equations (9) to (11) are exactly the same as equations (1) to (3) of the example of the prior art. The third term of equation (12) representing the output frequency $\omega_1$ of the inverter 1 is different from the example of the prior art, i.e., this term 3 is computed by means of the proportional integration means 93.

Next, the principle for a case where the output frequency $\omega_1$ is corrected by means of the proportional integration means 93 will be explained.

A voltage equation for the motor 2 with respect to the rotation coordinates $\gamma$-axis and $\delta$-axis that rotate in synchronization with the primary frequency of the motor 2 is given by the following equation if the secondary frequency $(\omega_1 - n\omega_m)$ is denoted as $\omega_2$.

$$\begin{pmatrix} v_\gamma \\ v_\delta \\ 0 \\ 0 \end{pmatrix} = \begin{pmatrix} R_1 + \sigma L_1 S, & \sigma L_1 \omega_1, & (1-\sigma)L_1 P, & (1-\sigma)L_1 \omega_1 \\ -\sigma L_1 \omega_1, & R_1 + \sigma L_1 P, & -(1-\sigma)L_1 \omega_1, & (1-\sigma)L_1 P \\ -R_2, & 0, & R_2 + L_2 P, & L_2 \omega_2 \\ 0, & -R_2, & -L_2 \omega_2, & R_2 + L_2 P \end{pmatrix} \begin{pmatrix} i_\gamma \\ i_\delta \\ \lambda_{\gamma M} \\ \lambda_{\delta M} \end{pmatrix} \quad (13)$$

where $\lambda_{\gamma M}$ and $\lambda_{\delta M}$ are values equal to the secondary magnetic flux interlinkages $\lambda_\gamma$ and $\lambda_\delta$ are divided by a mutual inductance M, $\theta$ is a leak coefficient $(1 - M_2/L_1 L_2)$.

Where a voltage shown in equation (10) is applied to the motor 2 as an exciting voltage $v_\delta^*$, if it is assumed that the voltage $v_\delta^*$ of equation (10) is equal to the voltage $v_\delta$ shown in the second line of equation (13), and $R_1$ used in equation (10) is denoted as $\tilde{R}_1$ and $\sigma L_1$ is denoted as $\sigma \tilde{L}_1$,
we obtain $$\begin{aligned} v_\delta &= v_\delta^* \\ &= -\sigma L_1 \omega_1 i_\gamma + (R_1 + \sigma L_1 P) i_\delta - \\ &\quad (1-\sigma)L_1 \omega_1 \lambda_{\gamma M} + (1-\sigma)L_1 P \lambda_{\delta M} \\ &= K(i_\delta^* - i_\delta) + \tilde{R}_1 i_\delta - \sigma \tilde{L}_1 \omega_1 i_\gamma \end{aligned} \quad (14)$$

By arranging equation (14), we obtain $$(\sigma \tilde{L}_1 - \sigma L_1)\omega_1 i_\gamma + \{(R_1 - \tilde{R}_1) + \sigma L_1 P\} i_\delta - \\ (1-\sigma)L_1 \omega_1 \lambda_{\gamma M} + (1-\sigma)L_1 P \lambda_{\delta M} = K(i_\delta^* - i_\delta) \quad (15)$$

The fourth line of equation (13) is $$-R_2 i_{67} - L_2 \omega_1 \lambda_{\delta M} + (R_2 + L_2 P)\lambda_{\delta M} = 0 \quad (16)$$

Therefore, $$P\lambda_{\delta M} = \frac{R_2}{L_2}(i_\delta - \lambda_{\delta M}) + \omega_2 \lambda_{\gamma M} \quad (17)$$

By substituting the equation (17) for equation (15), $P\lambda_{\delta M}$ is eliminated. By substituting $\omega_1 = n\omega_m + \omega_2$, the exciting current set value $i_\delta^*$ is controlled at constant. Here, suppose that $\sigma L_1 = \sigma \tilde{L}_1$, $(R_1 - \tilde{R}_1) i_\delta$ is ignored since it is small in comparison with the other terms, and $i_\delta \approx \lambda_{\delta M}$, then we obtain $$-(1-\sigma)L_1 n \omega_m \lambda_{\delta M} \approx K(i_\delta^* - i_\delta) \quad (18)$$

From the third line of equation (13), we obtain $$P\lambda_{\gamma M} = -\left(\omega_2 \lambda_{\delta M} - \frac{R_2}{L_2} i_\gamma\right) - \frac{R_2}{L_2} \lambda_{\gamma M} \quad (19)$$

From the above equation (18), $\lambda_{\gamma M}$ is approximately proportional to $-K(i_\delta^* - i_\delta)$. It is known that to increase $\lambda_{\gamma M}$, the secondary frequency $\omega_2$ should be decreased in equation (19); conversely, to decrease $\lambda_{\gamma M}$, the secondary frequency $\omega_2$ should be increased.

Therefore, to make $\lambda_{\gamma M}$ zero by vector control, where $\omega_m > 0$, when $-K(i_\delta^* - i_\delta) > 0$, the secondary frequency should be increased; when $-K(i_\delta^* - i_\delta) < 0$, the secondary frequency $\omega_2$ should be decreased.

Thus, vector control can be performed correctly by correcting the output frequency $\omega_1$ with $(K_P 30\ K_J/P)(i_\delta - i_\delta^*)$ sgn$\omega_m$ shown in the third term of equation (12).

That is, the sign function $-\text{sgn}\omega_m$ representing the direction of rotation of the motor 2 which becomes $-1$ when $\omega_m \geq 0$ and $-1$ when $\omega_m < 0$ is determined by means of the rotation direction detector 92 shown in FIG. 2. This sign function $-\text{sgn}\omega_m$ is multiplied with the difference $(i_\delta^* - i_\delta)$ between the exciting current set value $i_\delta^*$ and the exciting current $i_\delta$ by means of the multiplier 63. This multiplied valu is sent to the proportional integrator 82 where the discrepancy of the output frequency proportional to $(i_\delta^* - i_\delta)$ is computed, and the computed discrepancy $(K_P + K_I/S)(i_\delta - i_\delta^*)$ sgn$\omega_m$ is sent to the adder 45. The output frequency $\omega_1$ corrected in correspondence to the actual resistance value of the motor 2 is sent from the adder 45. The torque voltage $v_\gamma^*$, the exciting voltage $v_\delta^*$, and voltage phase $\theta_1$ are computed using the corrected output frequency $\omega_1$, which are then sent to the voltage coordinate converter 7.

The voltage coordinate converter 7 computes three-phase output voltages $v_u$, $v_v$, and $v_w$ on the basis of the sent torque voltage $V_\gamma^*$, exciting voltage $V_\delta^*$, and phase $\theta_1$, on/off signals for the switching elements of the inverter 1 on the basis of these output voltages.

Figure 3:
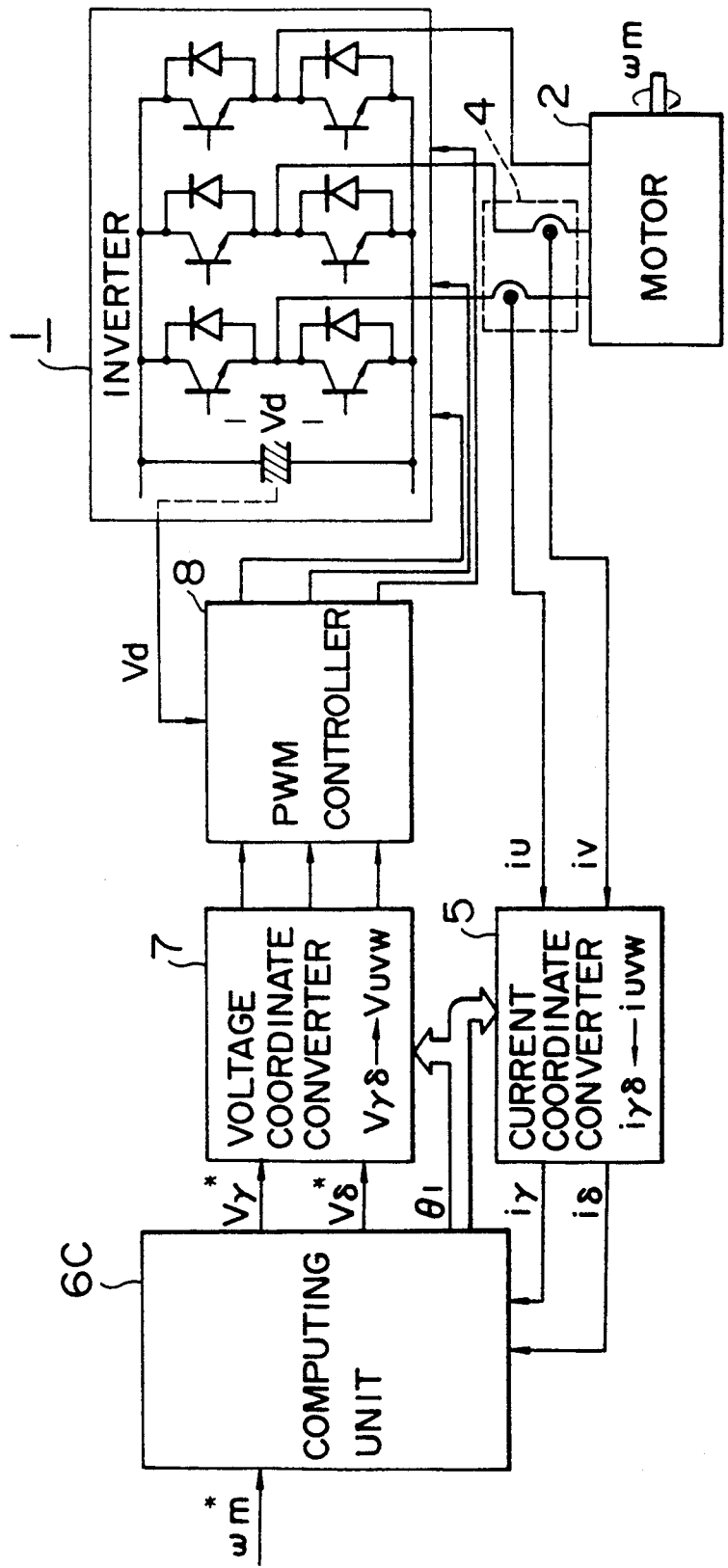
FIG. 3 is a block diagram illustrating an inverter control apparatus in a second embodiment of the present invention.
Figure 4:
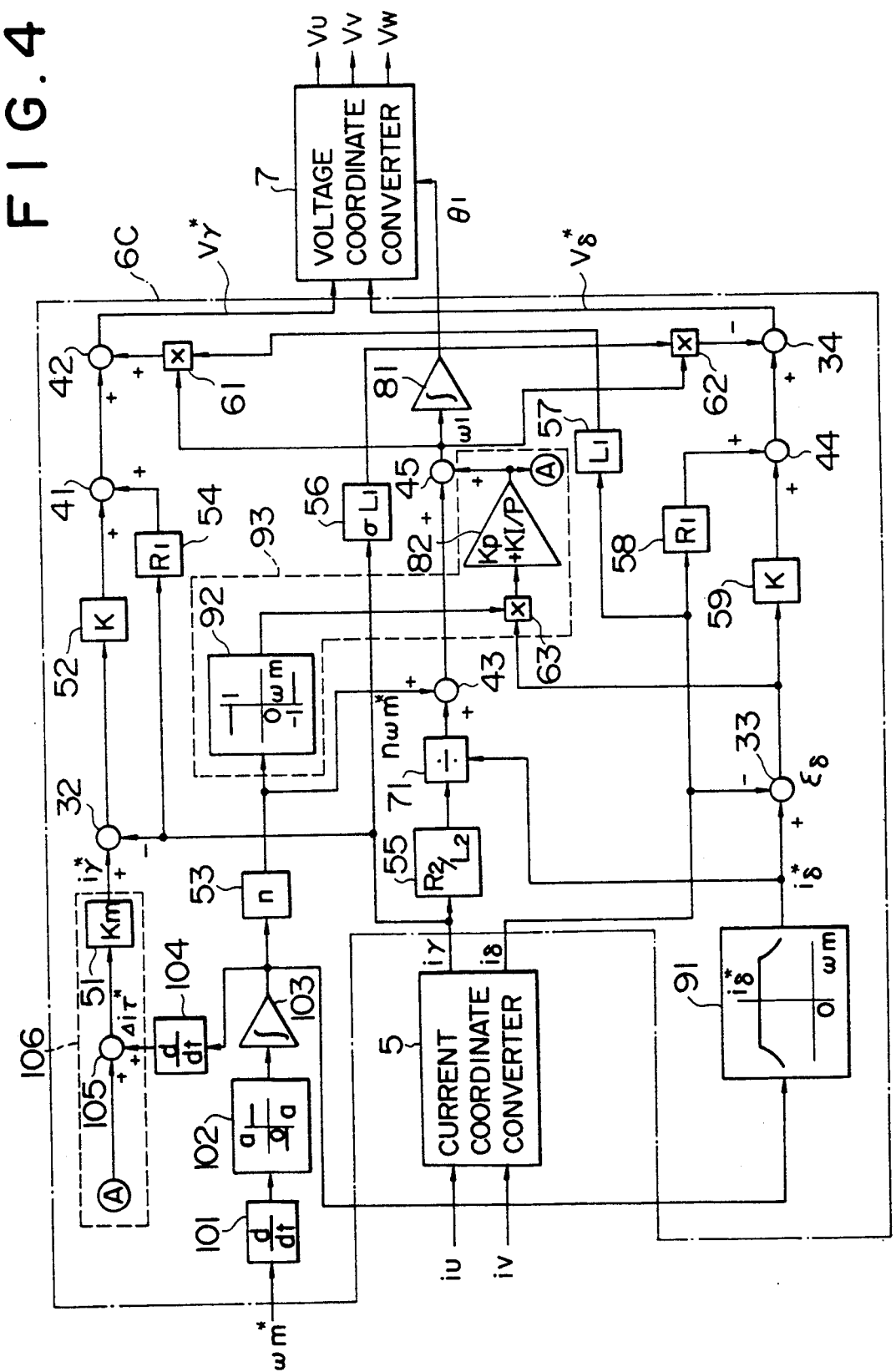
FIG. 4 is a block diagram illustrating a computing unit used in the second embodiment.

An inverter control apparatus in the second embodiment of the present invention is shown in FIG. 3. The apparatus of the the second embodiment is an apparatus in which the speed detector 3 is removed and a computing unit 6C is disposed in place of the computing unit 6B in the control apparatus of FIG. 1. The internal arrangement of the computing unit 6C is shown in FIG. 4. In FIG. 4, the same circuit elements as those of the computing unit 6B of the first embodiment shown in FIG. 2 are given the same numerals. Numeral 101 denotes a variation amount detector for detecting the amount of variation in the speed set value $\omega_m$, 102 denotes a limiter for limiting the amount of variation detected by the variation amount detector 101, 103 denotes an integrator for making the speed set value $\omega_m^*$ continuous by time-integrating the amount of variation in the speed set value limited by the limiter 102, 104 denotes a differentiator for computing a current instruction value $\Delta i_\tau^*$ to a generated torque on the basis of the speed set value $\omega_m^*$, and 105 denotes an adder for adding the current instruction value $\Delta i_\tau^*$ of the differentiator 104 with the correction value of the output frequency of the proportional integration means 93. This adder 105 and the amplifier 51 constitute the torque current instruction value computing means 106 for computing a torque current instruction value.

Next, the operation of this embodiment will be explained.

First, the basic rules in FIG. 4 are as shown below:

$$v_\gamma^* K(i_\gamma^* - i_\gamma) + R_1 i_\gamma i_\gamma + L_1 \omega_1 i_\delta^* \quad (20)$$

$$v_\delta^* = K(i_\delta^* - i_\delta) + R_1 i_\delta - \sigma L_1 \omega_1 i_\gamma \quad (21)$$

$$\omega_1 = n\omega_m^* + R_2 i_\gamma/(L_2 i_\delta^*) + (K_P + K_I/P) \\ (i_\delta - i_\delta^*)\text{sgn}\dot{\omega}_m^* \quad (22)$$

On the basis of this equation (22), the output frequency $\omega_1$ will be corrected so that the $\gamma$-axis component $\lambda_\gamma$ of the secondary interlinkage magnetic flux becomes zero. As a result, the speed of the motor 2 finally becomes the set value $\omega_m^*$. In this state, ideal vector control $\lambda_\gamma = 0$ and $\lambda_\delta = i_\delta^*$ is performed. This process is the same as that in the embodiment shown in FIG. 1, thus even if $R_1$ or $R_2$ has a small estimation discrepancy, this does not pose any problem in practical use.

Next, the torque current instruction value $i_\gamma^*$ is given by the following equation:

$$i_\delta^* = K_m[\Delta i_\tau^* - a(K_P + K_I/P) \cdot (i_\delta - i_\delta^*) sgn \omega_m^*] \quad (23)$$

In equation (23), $\Delta i_\tau^*$ is a current instruction related to the generated torque $\tau$. When the motor 2 should generate a positive torque, $\Delta i_\tau^*$ is chosen to be a positive value; when a negative torque is required, $\Delta i_\tau^*$ is chosen to be a negative value. The speed set value $\omega_m^*$ is restored so that it varies continuously by means of the integrator 103, after the amount of variation detected by the variation amount detector 101 is limited by the limiter 102 so that the motor 2 can fully follow the speed.

In equation (23), when the generation torque is greater than a required value, and the secondary magnetic flux leads the magnetic axis $\delta$ of the rotary magnetic-field (clockwise direction to be positive), $\lambda_\gamma > 0$. Conversely, the case of $\lambda_\gamma < 0$ occurs when the generated torque is insufficient.

Therefore, when $\lambda_\gamma > 0$, an operation is performed so that the torque current $i_\gamma$ is decreased; when $\lambda_\gamma < 0$, $i_\gamma$ is increased.

Although a limitation is imposed on the speed set value $\omega_m^*$ in the second embodiment, the following relation holds:

$$\Delta i_\gamma^* = \frac{d}{dt} \omega_m^*;$$

when an acceleration torque is required, the torque current instruction value $i_\gamma^*$ is increased. As a result, there is compensation for the fact that the estimation of $\lambda_\gamma$ from $(i_\delta^* - i_\delta)$ is impossible in the vicinity of speed set value $\omega_m^* = 0$.

Many widely different embodiments of the present invention can be made without departing from the spirit and scope thereof, therefore, it is to be understood that this invention is not limited to the specific embodiments thereof except as defined in the appended claims.

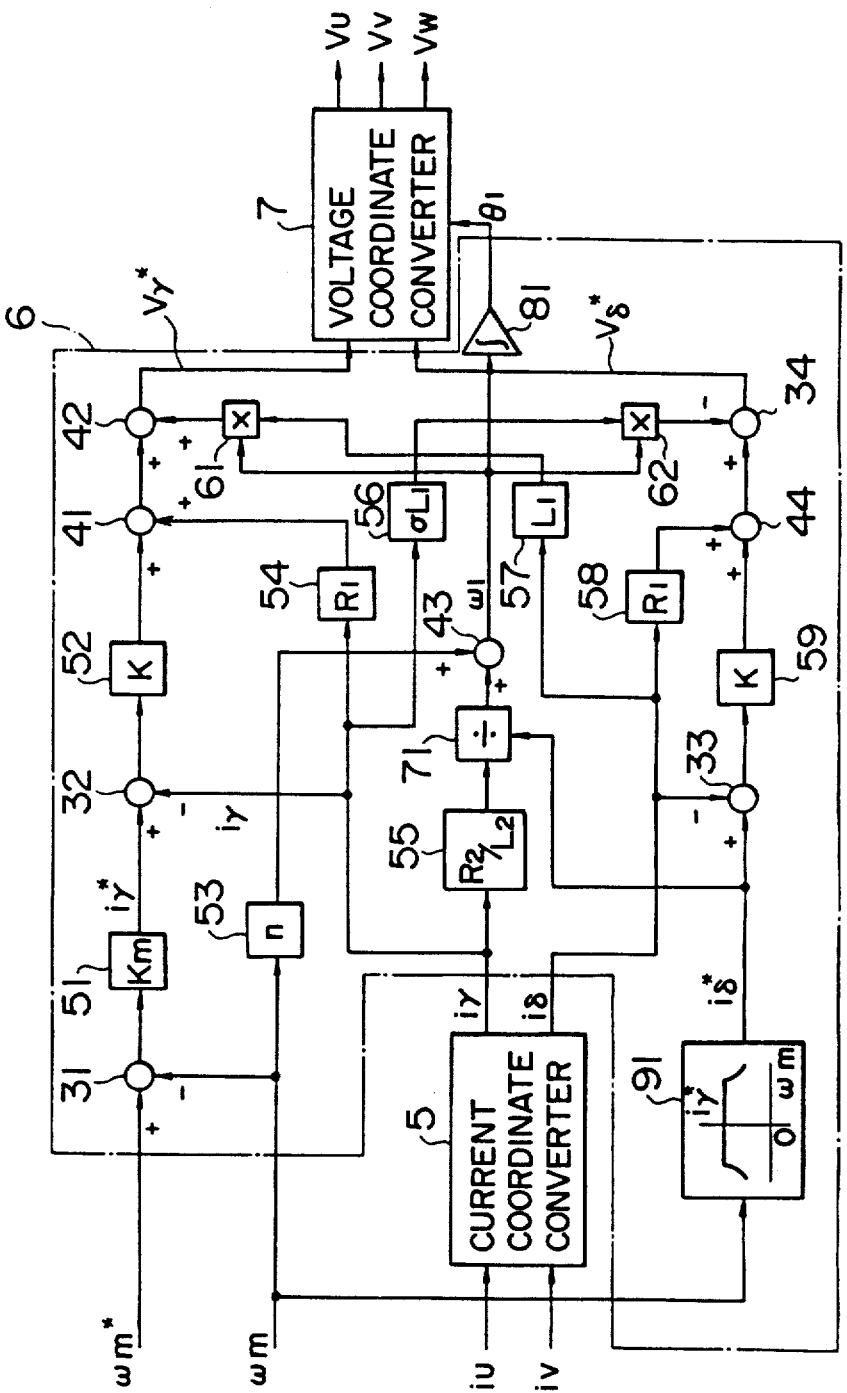

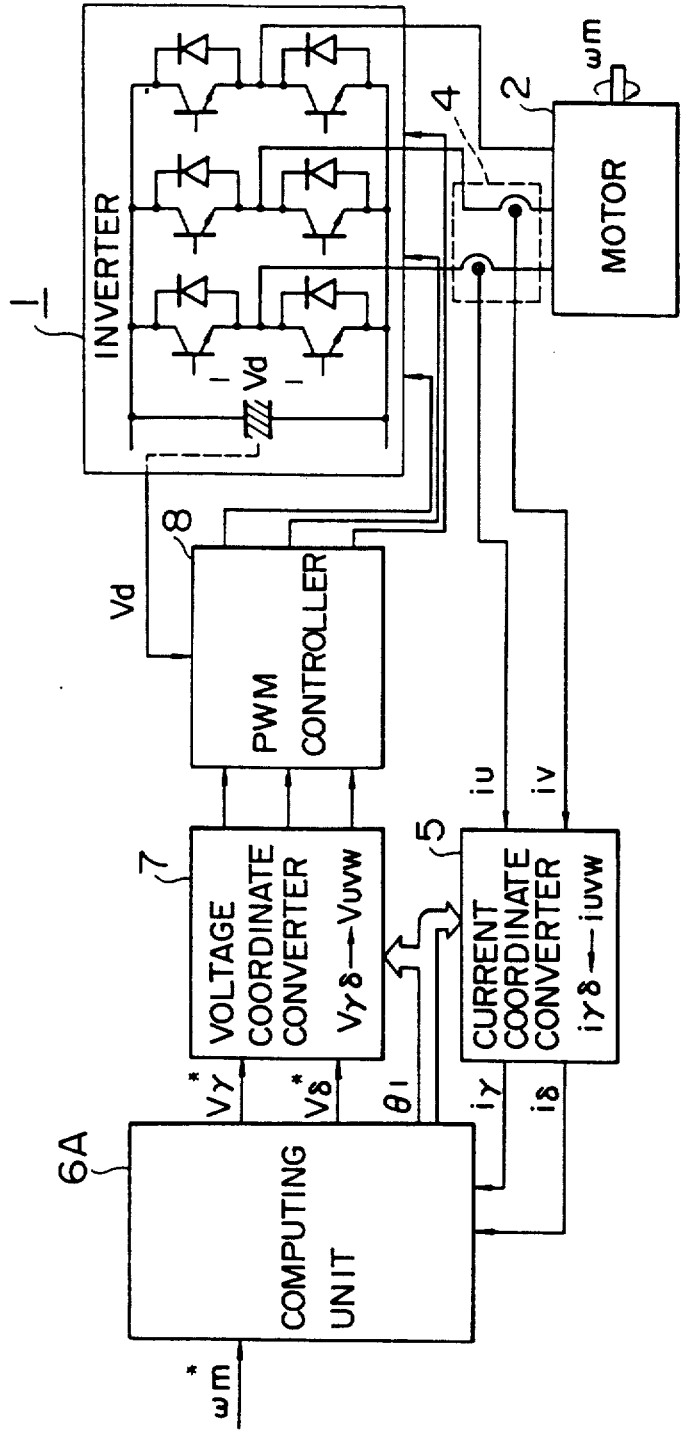

What is claimed is:

1. An inverter control apparatus, comprising:
    a current detector for detecting currents of two phases from among output currents of an inverter that drives an induction motor to rotate at a rotational speed, each of said output currents having an output frequency and an output voltage associated therewith;
    a current coordinate converter for converting currents detected by said current detector to a torque current and an exciting current;
    computing means for computing the output frequency of said inverter by using said torque current and said exciting current including discrepancy computing means for commuting a discrepancy proportional to the difference between an exciting current set value and said exciting current as a factor in computing said output frequency, and voltage component computing means for computing a torque voltage component and an exciting voltage component of the output voltage as a function of said computed output frequency;
    a voltage coordinate converter for converting said torque voltage component and said exciting voltage component to a three-phase AC voltage at the output frequency of said inverter; and
    a PWM controller for generating switching control signals for said inverter on the basis of said three-phase AC voltage obtained by said voltage coordinate converter.

2. The inverter control apparatus as claimed in claim 1, further including a speed detector for detecting the rotational speed of said induction motor, and wherein said computing means further includes:
    means for computing the rotational speed detected by said speed detector as a factor used in the computation of said output frequency.

3. The inverter control apparatus as claimed in claim 1, wherein said computing means further includes:
    means for computing a speed set value as a factor used in the computation of said output frequency;
    current instruction value computing means for computing a current instruction value related to a generation torque on the basis of said speed set value;
    torque current instruction value computing means for computing a torque current instruction value on the basis of said current instruction value and said discrepancy; and wherein
    said voltage component computing means includes
        torque voltage component computing means for computing said torque voltage component by using said torque current value by using said torque current instruction value, and p2 exciting voltage component computing means for computing said exciting voltage component as a function of said computed output frequency.

* * * * *

UNITED STATES PATENT AND TRADEMARK OFFICE
CERTIFICATE OF CORRECTION

PATENT NO. : 5,119,007

DATED : June 2, 1992

INVENTOR(S) : Yuzuru Tunehiro et al.

It is certified that error appears in the above-identified patent and that said Letters Patent is hereby corrected as shown below:

Col. 1, line 7 after "control" insert --of--.

Col. 1, line 46 (equation 1) "$L_1\omega_1 i_\gamma$" should be --$L_1\omega_1 i_\delta$--.

Col. 2, line 26 "set" should be --computed--.

Col. 2, line 48 "$(i_\gamma^* \ i_\gamma)$" should be --$(i_\gamma^* - i_\gamma)$--.

Col. 4, line 7 "n" should be --<u>n</u>--.

Col. 4, line 42 delete "actual".

Col. 4, line 43 before "motor" insert --actual--.

Col. 6, line 25 "$\leq$" should be --$\geq$--.

Col. 7, line 13 "θ" should be --σ--.

Col. 7, line 44 "$\sigma L_1$" should be --$\tilde{\sigma} L_1$--; and "$(R_1 - R_1)$" should be --$(\tilde{R}_1 - R_1)$--.

UNITED STATES PATENT AND TRADEMARK OFFICE
CERTIFICATE OF CORRECTION

PATENT NO. : 5,119,007
DATED : June 2, 1992
INVENTOR(S) : Yuzuru Tunehiro et al.

It is certified that error appears in the above-identified patent and that said Letters Patent is hereby corrected as shown below:

Col. 7, line 66 "($K_p30$" should be --($K_p$ + --.

Col. 8, line 17 "valu" should be --value--.

Col. 8, line 31, after "$\theta_1$" insert --The PWM controller 8 generates--.

Col. 8, line 62 should be changed to read --
$$v_\gamma^* = K(i_\gamma^* - i_\gamma) + R_1 i_\gamma + L_1 \omega_1 i_\delta^* \qquad (20)$$ --.

Col. 10, line 13 "commuting" should be --computing--.

Col. 10, line 51 delete "p2" and start a new indented paragraph.

Signed and Sealed this

Seventh Day of December, 1993

BRUCE LEHMAN

*Attesting Officer* — *Commissioner of Patents and Trademarks*

UNITED STATES PATENT AND TRADEMARK OFFICE
CERTIFICATE OF CORRECTION

PATENT NO. : 5,119,007
DATED : June 2, 1992
INVENTOR(S) : Yuzuru Tunehiro, et al It is certified that error appears in the above-indentified patent and that said Letters Patent is hereby corrected as shown below:

On drawing sheets, delete sheets 5-8, and substitute therefore, drawing sheets consisting of Figs. 5-8 as shown on attached pages.

Signed and Sealed this

Twenty-second Day of March, 1994

Attest:

BRUCE LEHMAN

Attesting Officer    Commissioner of Patents and Trademarks